United States Patent
Jamart et al.

(10) Patent No.: US 12,091,354 B2
(45) Date of Patent: Sep. 17, 2024

(54) METHOD FOR PRODUCING LAMINATED GLAZING WITHOUT ENAMEL STICKING TO THE BACK-GLASS

(71) Applicant: SAINT-GOBAIN GLASS FRANCE, Courbevoie (FR)

(72) Inventors: Juliette Jamart, Compiegne (FR); Valérie Chane-Pane, Sainte-Clotilde (FR); Leila Dumotier, Margny les Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 874 days.

(21) Appl. No.: 17/254,694

(22) PCT Filed: Jun. 25, 2019

(86) PCT No.: PCT/FR2019/051562
§ 371 (c)(1),
(2) Date: Dec. 21, 2020

(87) PCT Pub. No.: WO2020/002825
PCT Pub. Date: Jan. 2, 2020

(65) Prior Publication Data
US 2021/0179486 A1    Jun. 17, 2021

(30) Foreign Application Priority Data
Jun. 29, 2018 (FR) ................................. 1870775

(51) Int. Cl.
*C03C 17/00* (2006.01)
*C03B 23/025* (2006.01)

(52) U.S. Cl.
CPC ........ *C03C 17/008* (2013.01); *C03B 23/0252* (2013.01); *C03C 2217/45* (2013.01); *C03C 2217/485* (2013.01); *C03C 2218/119* (2013.01)

(58) Field of Classification Search
CPC ..................... C03C 17/008–009; C03C 17/23
See application file for complete search history.

(56) References Cited

U.S. PATENT DOCUMENTS

| | | | |
|---|---|---|---|
| 5,432,966 A * | 7/1995 | Berta | A61G 1/0212 5/11 |
| 5,660,893 A | 8/1997 | Boaz | |
| 5,677,064 A | 10/1997 | Boaz | |
| 5,759,220 A | 6/1998 | Boaz | |
| 2005/0003210 A1 | 1/2005 | Inoguchi et al. | |

OTHER PUBLICATIONS

International Search Report as issued in International Patent Application No. PCT/FR2019/051562, dated Oct. 1, 2019.

* cited by examiner

*Primary Examiner* — Erin Snelting
(74) *Attorney, Agent, or Firm* — Pillsbury Winthrop Shaw Pittman LLP

(57) ABSTRACT

A process for manufacturing a laminated glazing that includes at least a first glass sheet and a second glass sheet, includes printing a face of the first glass sheet intended to be oriented toward the second glass sheet with a liquid enamel which is dried at a temperature not exceeding 400° C., then bending the first and second glass sheets together in contact with one another in their relative position of destination in the laminated glazing, by heating at a softening temperature of the glass, wherein the liquid enamel is an aqueous silicate paint including a refractory powder of pigments and a silicate binder powder, in the absence of glass frit, and wherein a weight ratio of pigments to silicates is greater than 1.

10 Claims, No Drawings

METHOD FOR PRODUCING LAMINATED GLAZING WITHOUT ENAMEL STICKING TO THE BACK-GLASS

CROSS-REFERENCE TO RELATED APPLICATIONS

This application is the U.S. National Stage of International Application Ser. No. PCT/FR2019/051562, filed Jun. 25, 2019, which in turn claims priority to French Application No. 1870775, filed Jun. 29, 2018. The contents of all of these applications are incorporated herein by reference in their entirety.

The present invention relates to laminated glazings such as motor vehicle windshields consisting of two curved glass sheets bonded by means of an adhesive interlayer made of transparent thermoplastic of polyvinyl butyral (PVB) type.

Currently, at least one of these two glass sheets comprises a black peripheral coating. This coating has several functions: concealing the adhesive bond between the windshield and the body of the motor vehicle, protecting the organic adhesive from ultraviolet radiation, and also an esthetic function since it is in the field of view of the motor vehicle occupant.

It is customary to number the faces of the glass sheets of the laminated glazing starting from the face in contact with the external atmosphere, numbered 1. Thus, a windshield with two glass sheets comprises the faces 1, 2, 3 and 4, the latter being in contact with the passenger compartment of the motor vehicle. The process for manufacturing windshields customarily comprises the screenprinting of the coating on one of the two glass sheets or both: on face 2, face 3, face 4 or faces 2 and 4 for example.

The coating is deposited before the operation of bending the glass sheets, which consists in heating the two glass sheets together in a furnace at temperatures of the order of 610° C. for example. The coating deposited must be compatible with the glass bending process. In the case of a coating on face 2, respectively 3, this means that the coating must not bond to the counter-glass (face 3, respectively 2).

The coating may consist of enamel, which comprises pigments, glass frits, organic compounds, solvents, etc. In order to avoid the bonding of the coating during the bending operation, the enamel must first be pre-fired at high temperature at least equal to 450° C. for glass sheets that are 0.7 to 3.15 mm thick. This requires the use of a pre-firing furnace. Passing through this furnace may cause damage on the printed face of the coating. This pre-firing operation may therefore be a cause of production shutdown and loss of productivity. A significant increase in the percentage of scrap (1-2% with crises at 6-7%) may be observed for degradation of the optical properties due to differences in emissivity between the enameled and non-enameled zones during the pre-firing. The costs and above all the energy consumption linked to the pre-firing are high.

One drawback of the enamel coatings is also the presence of solvents and organic compounds that may give rise to questions of toxicity.

The invention has therefore set itself the task of finding a process for manufacturing printed and curved laminated glazings avoiding any bonding of the printed coating to the counter-glass, while reducing the energy consumption, eliminating the pre-firing operation in a specific furnace, and reducing or even eliminating the potentially toxic solvents and organic compounds.

This objective has been achieved by the invention, the subject of which is consequently a process for manufacturing a laminated glazing comprising at least a first glass sheet and a second glass sheet, wherein the face of the first glass sheet intended to be oriented toward the second is printed with a liquid enamel which is dried at a temperature not exceeding 400° C., then the first and second glass sheets are bent together in contact with one another in their relative position of destination in the laminated glazing, by heating at a softening temperature of the glass, characterized in that the liquid enamel is an aqueous silicate paint comprising a refractory powder of pigments and a silicate binder powder, in the absence of glass frit, and in that the weight ratio of pigments to silicates is greater than 1.

The paint according to the invention does not bond to the counter-glass during the bending of the two glass sheets, in the absence of a pre-firing at a relatively high temperature of at least 450° C. According to the invention, a predrying of the paint at a much more moderate temperature, or even at ambient temperature for 24 hours, is sufficient to guarantee the absence of bonding to the counter-glass. In the absence of glass frit in the liquid enamel for printing, this drying at moderate temperature makes it possible to obtain the desired enamel color, in particular black.

The potentially toxic solvents and organic compounds are in reduced, minor to zero, proportions.

According to preferred features of the process of the invention:

the organic fraction of the paint comprises at least 80% by weight of water, optionally at least one organic solvent and additives such as thickeners, surfactants; the organic fraction coincides with the whole of the liquid fraction, the solids content of the paint is exclusively mineral;

the paint comprises from 15% to 50% by weight of organic fraction;

the pigments comprises $Fe_2O_3$, $CuO$ and/or $MnO_2$;

the operation consisting in printing the first glass sheet is carried out by screen printing;

the liquid enamel is dried at a temperature not exceeding 350° C.;

the glass sheets are bent by heating at a temperature at least equal to 600° C. for at least 5 min, in particular by gravity sagging.

The invention will be better understood in light of four examples of paints below.

EXAMPLE

Four aqueous silicate paints are prepared from mixtures of exclusively mineral powders constituting the solids content of these paints. These four powders are analyzed by x-ray fluorescence spectroscopy using a spectrometer sold by the company Malvern Panalytical Ltd (UK) under the reference MagiX PRO, and with the aid of the semiquantitative program Omnian from the same company.

Only the boron of these powders is assayed by inductively coupled plasma (ICP) spectroscopy using a Vista-PRO® spectrometer from the company Varian Inc (USA).

The results are recorded in % by weight in table 1 below. ND stands for: not detected.

TABLE 1

| Paint No. | 1 | 2 | 3 | 4 |
|---|---|---|---|---|
| $SiO_2$ | 35.1 | 29.9 | 17.3 | 34.1 |
| $MnO_2$ | 21.9 | 26.4 | 18.3 | 11.3 |
| CuO | 15.8 | 17.9 | 0.2 | 0.2 |
| $Na_2O$ | 12.0 | 9.9 | 0.5 | 0.6 |

TABLE 1-continued

| Paint No. | 1 | 2 | 3 | 4 |
|---|---|---|---|---|
| $Fe_2O_3$ | 7.1 | 8.7 | 50.1 | 31.7 |
| $K_2O$ | 5.1 | 4.4 | 10.4 | 20.9 |
| $Al_2O_3$ | 2.0 | 1.6 | 1.2 | 0.8 |
| $SO_3$ | 0.2 | 0.2 | 0.1 | <0.1 |
| CaO | 0.1 | <0.1 | <0.1 | <0.1 |
| $TiO_2$ | <0.1 | <0.1 | <0.1 | <0.1 |
| $P_2O_5$ | ND | <0.1 | 0.3 | <0.1 |
| ZnO | ND | <0.1 | <0.1 | <0.1 |
| $ZrO_2$ | ND | <0.1 | ND | ND |
| BaO | ND | ND | 0.3 | ND |
| $Cr_2O_3$ | ND | ND | 0.1 | <0.1 |
| $Co_3O_4$ | ND | ND | 0.1 | ND |
| NiO | ND | ND | <0.1 | <0.1 |
| $B_2O_3$ | <0.05 | <0.05 | <0.05 | <0.05 |

In each of the four paints, the pigments are capable of consisting exclusively of CuO, $Fe_2O_3$ and/or $MnO_2$.

The paints are manufactured by adding to each of the four powders a liquid fraction consisting of water at more than 80% by weight, and minor amounts of additives (customary thickeners, surfactants, etc.) and optionally other solvents.

In table 2 below, the amounts are, like those of table 1, in % by weight. The proportion of organics (liquid fraction) is evaluated by thermogravimetric analysis.

TABLE 2

| Paint No. | 1 | 2 | 3 | 4 |
|---|---|---|---|---|
| Organics | 40 | 37 | 27 | 39 |
| Pigments in the solids content | 44.8 | 53 | 68.6 | 43.2 |
| Pigments in the liquid paint | 27 | 33 | 50 | 26 |
| Pigments/Silicates | 0.82 | 1.12 | 2.22 | 0.75 |
| Absence of bonding | NOK | OK | OK | NOK |
| Elements forming the pigments | Cu, Fe, Mn | Cu, Fe, Mn | Fe, Mn | Fe, Mn |

The Pigments/Silicates row expresses the weight ratio of these two groups of compounds. The pigments consist of the refractory powders of the solids content (see table 1), namely CuO, $Fe_2O_3$, and $MnO_2$, and the silicates consist of all the other constituents of the solids content: the binders.

Two 500 mm×300 mm×2.1 mm sheets of float soda-lime glass are used. One of the two glass sheets is printed with each of the four paints by screenprinting, in particular at its periphery and at the corners of the sheet. The paint is left to dry for 24 h in ambient air, which operation is optionally followed by passing through a furnace at 300° C. for 180 s, or else, according to a third drying mode, only the glass sheet passes through a furnace at 300° C. for 180 s.

The painted glass sheet is then paired up with the other unpainted glass sheet so that its painted surface is in contact with this other glass sheet. The bending of the two glass sheets thus in contact with one another is carried out by heating at 640° C. for 10 min in a furnace; the bending takes place by gravity sagging, upon softening of the glass.

The two glass sheets are then destined to be firstly separated, then bonded to one another by means of an adhesive interlayer for instance made of polyvinyl butyral (PVB). When they are thus separated, the paint remaining bonded to the counter-glass may damage at least one corner of one of the two glass sheets or both glass sheets, and/or be transferred at least partly to the counter-glass; this phenomenon is denoted by the expression "bonding of the paint".

In table 2, this bonding is reported in the "Absence of bonding" row by the evaluation NOK. The evaluation OK denotes on the contrary an absence of a damaged glass sheet corner, and of transfer of paint to the counter-glass. This evaluation, for each of the four paints, is independent of that of the three drying modes that have been selected. There is absence of bonding if, in the paint, the weight of pigments is greater than that of the silicate binders.

The invention claimed is:

1. A process for manufacturing a laminated glazing comprising at least a first glass sheet and a second glass sheet, the process comprising:
    printing a face of the first glass sheet intended to be oriented toward the second glass sheet with a liquid enamel which is dried at a temperature not exceeding 400° C., then
    bending the first and second glass sheets together in contact with one another in their relative position of destination in the laminated glazing, by heating at a softening temperature of the glass,
    wherein the liquid enamel is an aqueous silicate paint comprising a mineral powder made of a refractory powder of pigments and a silicate binder powder, in the absence of glass frit, wherein the silicate binder powder consists of all solid constituents of a solid content of the mineral powder other than CuO, $Fe_2O_3$, and $MnO_2$, wherein the pigments comprise at least one of $Fe_2O_3$, CuO and $MnO_2$, and wherein a weight ratio of the powder of pigments to the silicate binder powder is greater than 1.

2. The process as claimed in claim 1, wherein a liquid fraction of the paint comprises at least 80% by weight of (a) water and optionally both (b) at least one organic solvent and one or more additives.

3. The process as claimed in claim 2, wherein the one or more additives include a thickener, a surfactant or both.

4. The process as claimed in claim 1 wherein the paint comprises from 15% to 50% by weight of organic fraction.

5. The process as claimed in claim 1, wherein the pigments comprise $Fe_2O_3$, CuO and $MnO_2$.

6. The process as claimed in claim 1, wherein the printing of the first glass sheet is carried out by screenprinting.

7. The process as claimed in claim 1, wherein the liquid enamel is dried at a temperature not exceeding 350° C.

8. The process as claimed in claim 1, wherein the glass sheets are bent by heating at a temperature at least equal to 600° C. for at least 5 min.

9. The process as claimed in claim 1, wherein the glass sheets are bent by gravity sagging.

10. The process as claimed in claim 1, wherein the pigments comprise $MnO_2$.

* * * * *